(12) United States Patent
Homm et al.

(10) Patent No.: US 6,494,797 B1
(45) Date of Patent: Dec. 17, 2002

(54) AUTOMATIC TRANSMISSION ASSEMBLY AND METHOD OF OPERATING THE SAME

(75) Inventors: Manfred Homm, Büh-Neusatz (DE); Benjamin Kemmner, Unterensingen (DE); Ivo Agner, Bad Homburg (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/610,843

(22) Filed: Jul. 5, 2000

(30) Foreign Application Priority Data

Jul. 5, 1999 (DE) .......................... 199 30 989

(51) Int. Cl.$^7$ ............................................. F16H 59/14
(52) U.S. Cl. ......................................................... 474/18
(58) Field of Search ........................ 474/18, 28; 477/45, 477/46, 48

(56) References Cited

U.S. PATENT DOCUMENTS

| | | | |
|---|---|---|---|
| 4,637,257 A | * 1/1987 | von Rauch ................... | 73/706 |
| 4,796,489 A | * 1/1989 | Nagamatsu et al. .......... | 74/868 |
| 4,995,283 A | * 2/1991 | Sawasaki et al. ............. | 74/866 |
| 5,267,726 A | * 12/1993 | Takeo et al. ........... | 267/140.14 |
| 5,273,492 A | * 12/1993 | Kashiwase et al. ........... | 474/43 |
| 5,501,309 A | 3/1996 | Walth et al. | |
| 5,711,730 A | 1/1998 | Friedman et al. | |
| 5,725,447 A | 3/1998 | Friedmann et al. | |
| 5,782,327 A | 7/1998 | Otto et al. | |
| 5,807,090 A | * 9/1998 | Agner ........................ | 418/135 |
| 5,816,046 A | * 10/1998 | Paeth et al. .................... | 60/469 |
| 6,073,644 A | * 6/2000 | Friedman et al. .............. | 137/1 |
| 6,196,249 B1 | * 3/2001 | Kemmer et al. .............. | 137/82 |

FOREIGN PATENT DOCUMENTS

| | | |
|---|---|---|
| DE | 195 46 293 A1 | 6/1995 |
| DE | 198 46 815 A1 | 4/1999 |

* cited by examiner

*Primary Examiner*—David A. Bucci
*Assistant Examiner*—Vicky A. Johnson
(74) *Attorney, Agent, or Firm*—Darby & Darby

(57) ABSTRACT

A hydraulically operated automatic transmission assembly wherein a group of dynamic fluid consumers including a continuously variable transmission or a planetary change-speed transmission and a clutch is regulated by a unit which receives pressurized hydraulic fluid from a pump. The pump further serves to supply fluid to several static consumers, such as a torque converter and one or more cooling and/or lubricating units. The fluid which is supplied to the static consumers is influenced by a hydraulic resistor, such as a diaphragm or a throttle, and the quantity of such fluid is maintained within an acceptable range irrespective of eventual leakage of fluid which is being conveyed to the dynamic consumers and irrespective of pronounced fluctuations in the quantity of fluid being necessary for certain modes of operation of the dynamic consumers.

30 Claims, 9 Drawing Sheets

AUTOMATIC TRANSMISSION ASSEMBLY AND METHOD OF OPERATING THE SAME

BACKGROUND OF THE INVENTION

The invention relates to improvements in hydraulically operated automatic transmission assemblies, and to a method of supplying hydraulic fluid to the fluid-consuming or utilizing constituents of such transmission assemblies.

German patent No. 195 46 293 A1 discloses a hydraulically operated automatic transmission assembly which can be utilized in the power train of a motor vehicle to transmit torque between the engine and the wheels, normally in response to engagement of a friction clutch which serves to transmit torque between the rotary output element of the engine and the rotary input element of the variable speed or change speed transmission forming part of the automatic transmission assembly. The patented transmission assembly employs at least one static fluid consumer, a hydraulic transmission regulating component (e.g., a proportional and/or another valve), and at least one dynamic fluid consumer which is controlled by the transmission regulating component(s). The at least one static fluid consumer can include or constitute a fluid cooling unit, and the at least one dynamic fluid consumer can constitute a regulating arrangement for a continuously variable transmission (CVT). The speed ratio of such CVT is variable by the at least one transmission regulating component of the hydraulic transmission regulating unit. The patented transmission assembly further comprises a hydraulic resistor which is installed in a conduit serving to supply pressurized hydraulic fluid from the source to the static and dynamic fluid consumers. The source can include a pump which circulates transmission fluid in the automatic transmission assembly.

The aforementioned conduit receives hydraulic fluid from a fluid conveying unit which supplies fluid for the CVT and is located upstream of a volumetric flow regulator the regulating or adjusting function of which is influenced by the hydraulic resistor. In other words, the hydraulic resistor determines or controls the maximal volumetric flow of the working fluid because the quantity of conveyed fluid depends upon the RPM of the fluid conveying unit. Thus, when the RPM rises to a predetermined value, the fluid conveying unit delivers a volumetric flow of the working fluid which exceeds the fluid requirements of the automatic transmission assembly. The total or overall fluid flow which is supplied by the fluid conveying unit is divided into first and second flows for the static and dynamic fluid consumers, respectively.

As used herein, the term "dynamic fluid consumer" is intended to denote each consumer which, at least for a certain relatively short interval of time, requires a varying supply of hydraulic fluid. For example, an actuator in the hydraulic circuit of a prime mover is operated by receiving a variable supply of hydraulic fluid. In addition to the aforediscussed variable-RPM consumers (such as a CVT), dynamic fluid consumers further encompass, for example, various types of engageable and disengageable clutches including the so-called lockup or bypass clutches of torque converters. On the other hand, the term "static fluid consumer" is intended to denote those consumers of hydraulic fluid which, at least as a rule, receive fluid at a constant or substantially constant rate. Such static fluid consumers include cooling units for hydraulic fluid, the torque converter(s) and the lubricating means.

The patented automatic transmission assembly is operated in such a way that the conduit conveys the regulated volumetric flow into the transmission regulating unit. A portion of such flow is lost in the dynamic fluid consumers and as a result of leakage. The remainder of the flow is conveyed into the static fluid consumer or consumers. Any fluid that remains is caused to enter the suction side of the fluid conveying unit. The just described sequence of utilization of the fluid flow is considered to be necessary in order to ensure that a body of highly pressurized fluid reaches those consumers (normally or preferably including the dynamic consumer or consumers) which require a highly pressurized fluid, and that the working fluid thereupon reaches the low-pressure consumer or consumers normally encompassing the static fluid consumer(s). The fluid pressure is selected or regulated prior to admission into the consumer(s) requiring highly pressurized hydraulic fluid; however, the pressure of hydraulic fluid which is conveyed to the static fluid consumer(s) and/or to other consumers of lower-pressure fluid is normally determined by the quantity of fluid which is available for such purpose and by the geometry (a) of the piping which confines the low-pressure fluid and (b) the static fluid consumer(s). This results in the establishment, in the low-pressure region, of a specific "backwater" effect.

In an automatic transmission assembly for use in a motor vehicle, it is normally desirable or necessary to ensure that the operation be satisfactory while the temperature of transmission fluid fluctuates within a range of between about −30° C. and +140° C. When the fluid temperature (within the just mentioned range) is relatively high, the losses due to leakage increase (because the viscosity of the fluid is relatively high) well above average losses, and this applies especially for leakages in the transmission regulating unit. The fluid which escapes due to such increased temperature-induced reduction of viscosity is considered a lost fluid, i.e., a fluid which is not returned into the intake of the fluid conveying unit including the pump or another source of pressurized fluid.

It has been found that, if the temperature of the transmission fluid rises to a high or very high value (e.g., to a range of between +90° C. and +140° C.), the quantity of hydraulic fluid reaching the low pressure section (including the static fluid consumer or consumers) is too low. Thus, the operation of the lubricating system and/or of the cooling system of the automatic transmission assembly is likely to be unsatisfactory. Consequently, the temperature of fluid which has been caused to flow through the cooling unit or units is not sufficiently low (i.e., has not been sufficiently lowered) to ensure adequate cooling of the entire supply of transmission fluid because the percentage of fluid flowing through the cooling unit or units is too small. This entails a further rise of fluid temperature, i.e., a further drop of viscosity and additional leakage. Such chain reaction entails a progressively decreasing rate of fluid flow through the cooling system and a progressively increasing heating of the circulating transmission fluid. The result is an unstable condition of the automatic transmission assembly, and such condition is aggravated due to continuously increasing percentage of escaping leak fluid so that, if such situation persists, all consumers are likely to receive insufficient quantities of transmission fluid. Attempts to overcome such problems in presently known automatic transmission assemblies include an increase of the regulated volumetric flow.

If the temperature of the transmission fluid drops to a low or very low value (e.g., to between about −30° C. and 0° C.), the static fluid consumer or consumers receives or receive relatively large quantities of hydraulic fluid. Furthermore, as the viscosity of the transmission fluid increases, friction within the fluid also increases; this is particularly undesirable in connection with the flow of fluid through the conduits. Consequently, the pressure of fluid in the static consumer(s) is likely or bound to rise to an excessive value, namely to a value which can entail a destruction of a static fluid consumer (e.g., the fluid cooling unit or units). Moreover, the high pressure of fluid entering the low-pressure fluid consumer or consumers is bound to exert an adverse influence upon (such as an excessive rise of pressure of) fluid flowing in the dynamic consumer or consumers as well as of fluid flowing back into the fluid conveying or supplying unit. This can cause extensive damage to such constituents of the automatic transmission assembly and a pronounced drop of the efficiency of such assembly.

Another drawback of the aforediscussed conventional automatic transmission assemblies is that, when the fluid requirements of the dynamic consumers are high or very high, the surplus over the normal or average fluid requirements of such dynamic consumer(s) is detracted from the fluid which is normally available for static fluid consumers and is no longer returned to the fluid conveying unit, i.e., to the pump. For example, the fluid requirements of dynamic fluid consumers are likely or bound to increase for relatively short periods of time during filling of clutches and/or during actuation of the speed ratio selector for the change-speed transmission (such as the aforementioned continuously variable transmission). Such losses of transmission fluid must be taken into consideration in connection with the calculation of those quantities of transmission fluid which are to be made available for the static fluid consumer(s).

This application claims the priority of the commonly owned copending German patent application Serial No. 199 30 989.2 filed Jul. 5, 1999. The disclosure of the just mentioned priority application, as well as the disclosure of each and every U.S. and/or foreign patent and/or patent application identified in the specification of the present application, is incorporated herein by reference.

OBJECTS OF THE INVENTION

An object of the invention is to provide a novel and improved method of supplying hydraulic fluid to the consumers in an automatic transmission assembly.

Another object of the invention is to provide a method which renders it possible to operate with relatively small quantities of transmission fluid or another suitable hydraulic fluid.

A further object of the instant invention is to provide a method which renders it possible to invariably satisfy or meet the requirements of the static fluid consumer(s) even if the requirements of the dynamic fluid consumer(s) fluctuate within a wide range.

An additional object of the present invention is to provide a method which ensures that pronounced changes or fluctuations of the temperature of transmission fluid cannot, or are less likely to, exert an adverse influence upon the availability of fluid for proper operation of one or more static and/or dynamic fluid consumers.

Still another object of the invention is to provide a novel and improved hydraulically operated automatic transmission assembly which can be utilized for the practice of the above outlined method.

A further object of the invention is to provide an automatic transmission assembly with novel and improved means for allotting requisite quantities of transmission fluid for use by the static and dynamic fluid consumers.

Another object of the invention is to provide a motor vehicle wherein the power train embodies a hydraulically operated automatic transmission assembly of the above outlined character.

An additional object of the invention is to provide an automatic transmission assembly with novel and improved means for rendering the quantities of transmission fluid which are available for one of the static and dynamic fluid consumers less dependent upon, or independent from, the fluid requirements of the other of the static and dynamic components.

Still another object of the invention is to provide a novel and improved array of hydraulic lines for use in the above outlined automatic transmission assembly.

A further object of the invention is to provide a novel and improved combination of valves, flow restrictors and other hydraulic fluid flow influencing components for use in the above outlined automatic transmission assembly.

Another object of the invention is to provide a novel and improved automatic transmission assembly which can be installed in existing power trains of motor vehicles as superior substitutes for heretofore known automatic transmission assemblies.

An additional object of the invention is to provide a novel and improved modular automatic transmission assembly which can be utilized in the power trains of motor vehicles.

SUMMARY OF THE INVENTION

One feature of the instant invention resides in the provision of a method of supplying hydraulic fluid (such as a transmission fluid) to at least one static consumer and at least one dynamic consumer. The consumers form part of an automatic transmission assembly, and the method comprises the steps of establishing a source of pressurized hydraulic fluid, supplying a first fluid flow from the source to the at least one dynamic consumer along at least one first path, and conveying a second fluid flow from the source to the at least one static consumer along at least one second path wherein the fluid is not influenced by the at least one dynamic consumer (such terminology embraces situations and/or circumstances when the fluid being supplied to the at least one static consumer is not appreciably influenced by the at least one dynamic consumer).

The method can further comprise the step of regulating the rate of fluid flow (i.e., the volumetric flow) of fluid along the second path. Such regulating step can include controlling the pressure of fluid flow along the second path, e.g., maintaining the pressure of fluid in the second path below a predetermined maximum value, preferably within a predetermined range.

The method can also comprise the step of regulating the rate of fluid flow along the first path.

Furthermore, the improved method can comprise the steps of conveying a third fluid flow or stream from the source (such as a vane pump) along a third path, diverting a portion of the third flow from the third path into the at least one first path to thus form the first flow or stream, and diverting or directing a second portion of the third flow from the third path into the at least one second path to thus form the second flow or stream.

Morover, the improved method can comprise the step of propagating the first and second fluid flows along the respective paths independently of each other.

The flow of fluid to the consumers can be controlled by a flow regulating unit having at least one transmission regulating component (such as a valve), and the fluid supplying step of such method can include influencing the first fluid flow by the at least one regulating component of the regulating unit.

Numerous embodiments of novel and improved apparatus which can be utilized for the practice of the above outlined method will be described hereinbelow. One such (hydraulically operated) apparatus (hereinafter called automatic transmission assembly or assembly or transmission assembly for short), which is especially suited for utilization in the power train or drive train of a motor vehicle, comprises at least one static fluid consumer, at least one dynamic fluid consumer, a regulating unit including at least one transmission regulating component, a source of pressurized hydraulic fluid, means for supplying a first stream or flow of pressurized fluid from the source to the at least one dynamic consumer along a first path wherein the first flow is influenced by the at least one regulating component, and means for conveying a second flow or stream of pressurized fluid from the source to the at least one static consumer along a second path wherein the fluid is not influenced by the at least one dynamic consumer.

Another embodiment of the improved hydraulically operated transmission assembly comprises at least one static fluid consumer, at least one dynamic fluid consumer, a source of pressurized hydraulic fluid, a fluid-supplying first conduit connecting the outlet of the source with the at least one static fluid consumer, a volumetric flow regulator in the first conduit, means for influencing the flow regulator (such influencing means includes a hydraulic resistor in the first conduit), a second conduit which receives fluid from the first conduit upstream of the hydraulic resistor and is connected to the at least one dynamic fluid consumer, and a transmission regulating unit including at least one component (such as a 4/2-way valve or a pressure raising valve) arranged to regulate the flow of fluid in the second conduit.

The second conduit can branch off the first conduit upstream of the volumetric flow regulator.

The aforementioned means for influencing the flow regulator can be installed in the first conduit downstream of the flow regulator, and the second conduit can branch off the first conduit downstream of the volumetric flow regulator but upstream of the influencing means.

The improved assembly can further comprise a fluid conveying unit having a housing for the source, and the aforementioned hydraulic resistor can be disposed in such housing. The housing of the fluid conveying unit can accommodate the source and the hydraulic resistor, the source and the volumetric flow regulator, or the source jointly with the hydraulic resistor and the flow regulator.

The hydraulic resistor can be installed in the transmission regulating unit, and the assembly can further comprise at least one additional conduit which serves to return fluid from the hydraulic resistor to the volumetric flow regulator.

The source of pressurized fluid can form part of the fluid conveying unit, and the hydraulic resistor and/or the volumetric flow regulator can be installed in the first conduit between the source and the transmission regulating unit.

The volumetric flow regulator can be installed in the transmission regulating unit.

The aforementioned housing of the fluid conveying unit can be designed to accommodate the source and can be affixed to the transmission regulating unit.

The transmission regulating unit can comprise a plurality of components which serve to regulate the flow of fluid in the second conduit, and the first conduit can include a section which connects one of the plurality of components with the at least one static fluid consumer; the hydraulic resistor can be disposed in the aforementioned section of the first conduit.

The volumetric flow regulator can comprise a valve having a body defining a chamber for a reciprocable valving element. Such assembly can further comprise a first return conduit having an intake end communicating with the first conduit upstream of the hydraulic resistor and a discharge end communicating with the chamber at a first end face of the valving element, and a second return conduit having an inlet communicating with the first conduit downstream of the hydraulic resistor and an outlet communicating with the chamber at a second end face of the valving element.

The hydraulic resistor can comprise a measuring diaphragm and/or a measuring throttle.

It is also possible to design the improved assembly in such a way that the inlet of a return conduit communicates with the first conduit downstream of the hydraulic resistor and that the outlet of such return conduit discharges fluid into the aforementioned volumetric flow regulator. The return conduit can contain a damping diaphragm.

The volumetric flow regulator can be installed in the fluid flow conveying unit, the same as the source of pressurized fluid, and the hydraulic resistor can be installed in the transmission regulating unit.

If the source, the hydraulic resistor and the flow regulator are installed in the housing of the fluid conveying unit, a first portion of the first conduit in such assembly can be disposed in the fluid conveying unit and a second portion of the first conduit is connected to the at least one static consumer. A first portion of the second conduit can be disposed in the fluid conveying unit and a second portion of such second conduit is connected to the at least one dynamic consumer.

The dynamic fluid consumer or consumers can include a transmission (such as a planetary or a CVT) and/or a friction clutch, and the static fluid consumer or consumers can include at least one fluid cooling unit and/or a torque converter and/or at least one further consumer (such as a lubricating unit).

If the at least one dynamic consumer comprises a CVT, the assembly can further comprise a torque sensor which is connected with the output of a prime mover (such as the internal combustion engine of a motor vehicle) and is associated with the CVT. The latter can be of the type embodying first and second adjustable pulleys, an endess flexible element (such as a link chain) trained over the pulleys and hydraulic fluid-operated adjusting motors for the pulleys. Such motors can constitute dynamic fluid consumers.

It will be seen that, if the transmission regulating unit comprises or controls a hydraulically adjustable CVT, the dynamic fluid consumer means can comprise hydraulic adjusting means (such as the aforementioned motors) for the CVT.

In a further embodiment of the improved adjustable transmission assembly, the hydraulic resistor is variable in depedency upon temperature changes of the hydraulic fluid. Such hydraulic resistor can comprise a measuring throttle. The arrangement can be such that the hydraulic resistor defines a path for the flow of hydraulic fluid from the outlet of the source of pressurized fluid to the at least one static fluid consumer, and the path for the flow of fluid through the resistor is variable as a function of temperature changes of conveyed fluid.

The novel features which are considered as characteristic of the invention are set forth in particular in the appended claims. The improved hydraulically operated automatic transmission assembly itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
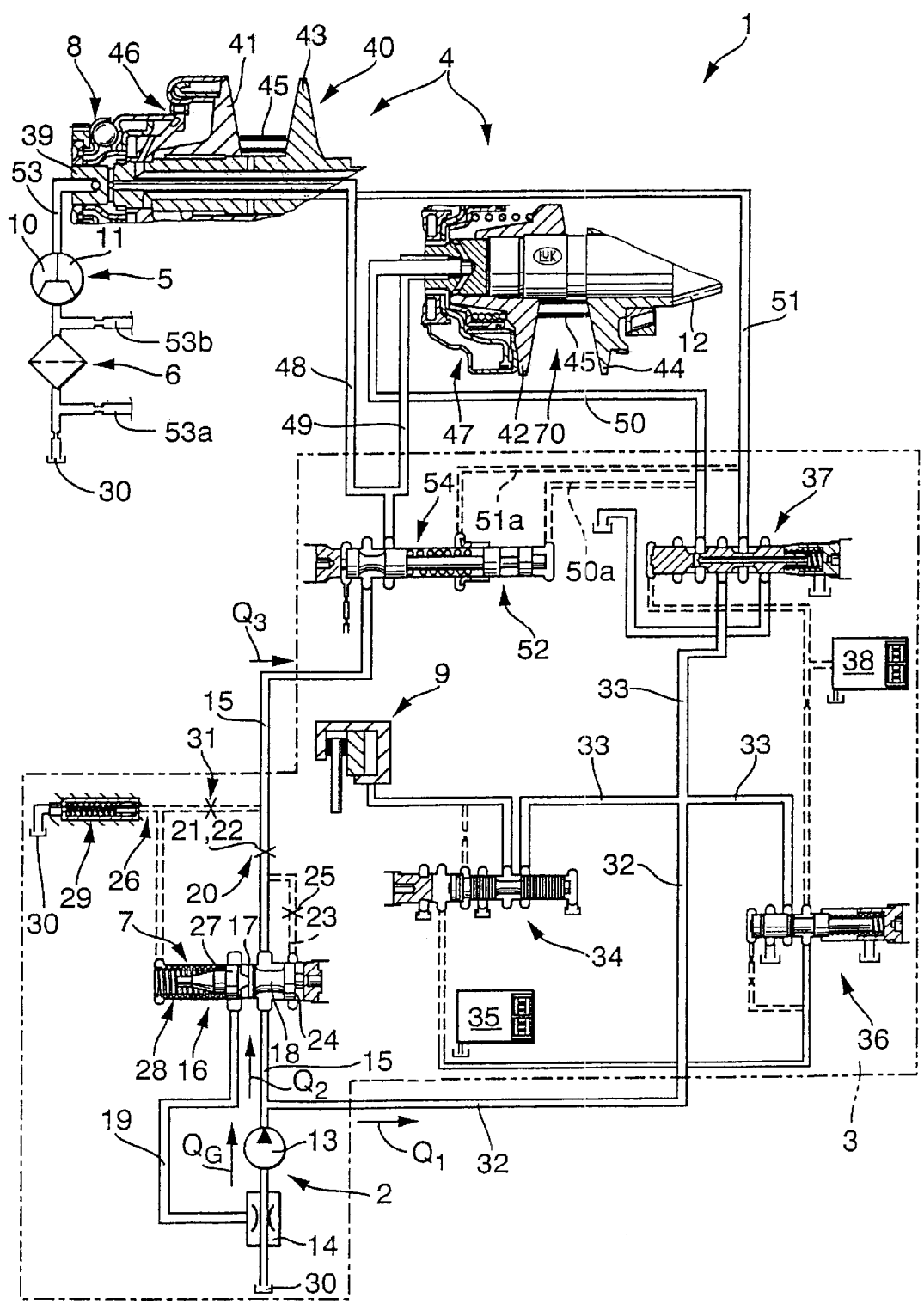
FIG. 1 is a fragmentary schematic partly elevational and partly sectional exploded view of a hydraulically operated automatic transmission assembly which embodies one form of the present invention.

FIG. 1 illustrates certain details of a hydraulically operated automatic transmission assembly 1 which can be utilized in the power train of a motor vehicle and is constructed and assembled in accordance with one embodiment of the present invention. The improved assembly 1 comprises a first dynamic fluid consumer in the form of a continuously variable transmission (CVT) 4. However, it is to be noted that the transmission assembly of the present invention can also employ other types of transmissions in lieu of the CVT 4, e.g., a planetary transmission having a given number of gear ratios.

The assembly 1 further comprises a fluid conveying unit 2 including a pump 13 having an outlet connected to a first conduit 15 serving to convey a first volumetric fluid flow Q3 to one or more static fluid consumers. FIG. 1 shows two static consumers 5, 6 and a branch conduit 53a leading to a further static consumer (not shown) serving as a lubricating system for the assembly 1. The static consumer 5 is a torque converter, e.g., a torque converter of the type disclosed in commonly owned U.S. Pat. No. 5,501,309 (granted Mar. 26, 1996 to Walth et al. for "HYDROKINETIC TORQUE CONVERTER WITH LOCKUP CLUTCH") or in commonly owned U.S. Pat. No. 5,782,327 (granted Jul. 21, 1998 to Otto et al. for "HYDROKINETIC TORQUE CONVERTER AND LOCKUP CLUTCH THEREFOR").

The static consumer 6 is a cooling unit for hydraulic fluid which is to be returned to the inlet of the pump 13, and the conduit 53a conveys fluid to at least one further static consumer, such as the aforementioned lubricating system.

A second conduit 32 (which branches off the conduit 15) conveys a second volumetric fluid flow or stream Q1 to a regulating unit 3 for the transmission (CVT) 4. The reference character 7 denotes a volumetric flow regulator which is installed in the first conduit 15 downstream of the latter's junction with the second conduit 32. A torque sensor 8 (e.g., of the type disclosed in the commonly owned U.S. Pat. No. 5,711,730 granted Jan. 27, 1998 to Friedmann et al. for "TORQUE MONITORING APPARATUS") is installed in the path of power flow from a prime mover (such as the internal combustion engine, not shown, of a motor vehicle) to the input shaft 39 of the transmission 4.

FIG. 1 further shows a portion of a so-called lockup of bypass clutch 9 which is incorporated in the housing of the torque converter 5 to establish, when necessary, a torque transmitting connection between the pump 10 and the turbine 11 of the torque converter. The lockup clutch 9 constitutes a second dynamic fluid consumer of the transmission assembly 1. Additional clutch(es) can be employed in the transmission assembly 1; for example, this assembly can employ a clutch which is engageable and disengageable to change the direction of rotation of the transmission 4 or of a transmission (such as a planetary) which is utilized in lieu of the transmission 4.

The intake of the pump 13 in the fluid conveying unit 2 receives hydraulic fluid from an injector 14 which also forms part of the unit 2 and draws fluid from a plurality of sources including a tank 30. The injector 14 constitutes an optional but highly desirable feature of the fluid conveying unit 2.

The volumetric flow regulator 7 comprises or consists of a volumetric flow regulating valve 16 which is installed in the first conduit 15. The housing or body of the valve 16 has a cylinder chamber 17 for a reciprocable piston-like valving element 18 (hereinafter called piston). The chamber 17 preferably exhibits a circular cross-sectional outline. A return conduit 19 has an inlet in communication with a port in the body of the valve 16, and the outlet of the conduit 19 delivers (when necessary) hydraulic fluid from the first conduit 15 back to the intake of the pump 13, e.g., into the injector 14. The establishment and interruption of communication between the conduits 15, 19 is regulated by the piston 18 in the cylinder chamber 17 of the valve 16.

FIG. 1 further shows a hydraulic resistor 20 which is installed in the conduit 15 downstream of the volumetric flow regulating valve 16 and can include a measuring flow resistor (throttle) 21 and/or a measuring diaphragm 22. The important details of hydraulic resistors which can be utilized (or which are presently preferred for use) in the transmission asssembly 1 and in other embodiments of the improved transmission assembly will be described in requisite detail hereinafter.

A return conduit 23 for pressurized hydraulic fluid has an inlet which branches off the first conduit 15 upstream of the hydraulic resistor 20 and contains a damping diaphragm 25. The outlet of the return conduit 23 communicates with the chamber 17 of the valve 16 at the right-hand surface or end face 24 of the piston 18. Thus, the fluid which flows from and beyond the valve 16 toward the hydraulic resistor 20, and a portion of. which enters the return conduit 23, is conveyed back to the valve 16 and urges the piston 18 in a direction to the left, as viewed in FIG. 1. The damping diaphragm 25 in the return conduit 23 constitutes an optional feature of the transmission assembly 1.

An additional return conduit 26 branches off the first conduit 15 downstream of the hydraulic resistor 20 and serves to convey fluid into the left-hand portion of the chamber 17 at the left-hand end face or surface 27 of the piston 18. The end face 27 of the piston 18 is further acted upon by at least one energy storing element 28, e.g., a prestressed coil spring which tends to shift the piston in a direction to the right, i.e., against the opposition of fluid acting upon the end face 24. A branch of the return conduit 26 contains a pressure limiting or relief valve 29; when the pressure in the conduit 26 rises to a preselected value, the relief valve 29 opens and permits fluid to flow from the conduit 26 back into the tank 30, i.e., to the suction or inlet side of the pump 13. A damper diaphragm 31 is installed in the return conduit 26 downstream of the latter's junction with the conduit 15 and upstream of the relief valve 29 and tank 30. The purpose of the diaphragm 31 is to damp the movements of the piston 18 in the body of the valve 16.

The discharge end of the first conduit 15 conveys fluid into the transmission regulating unit 3.

The inlet end of the second conduit 32 communicates with the first conduit 15 immediately downstream of the pump 13 and conveys the stream or flow Q1 of pressurized hydraulic fluid into the transmission regulating unit 3. Thus, the fluid flow Q1 which is being supplied to the unit 3 does not influence the fluid flow Q3 downstream of the hydraulic resistor 20, and vice versa. The flow Q1 is part of a combined volumetric fluid flow QG which is supplied by the pump 13. The other part of the combined flow QG is fluid flow Q2 and is supplied to the volumetric flow regulator 7, and the flow Q3 is part of the flow Q2. The flow Q1 is not influenced by the volumetric flow regulator 7 but the latter influences the flow Q2 which is thus "converted" or "Transformed" into the flow Q3 being supplied to the static fluid consumers including the torque converter 5 and the cooling unit 6. The flow Q3 is influenced and actually determined or established by the hydraulic resistor 20. The latter influences the regulating function of the volumetric flow regulator 7 in cooperation with the return conduits 23 and 26; this renders it possible to determine in advance the characteristics of the flow Q3 with a very high degree of accuracy.

By appropriate setting of the axial position of the piston 18 in chamber 17, the valve 16 of the volumetric flow regulator 7 can determine that percentage of the quantity of fluid in the flow Q2 which is not necessary or required for the flow Q3, i.e., that portion of the flow Q2 which is returned to the intake of the pump 13 (and more specifically to the injector 14) by way of the conduit 19. The fluid being returned by the conduit 19 is utilized to enhanced the suction pressure at the inlet of the pump 13.

That portion of the conduit 32 which is located within the confines of the transmission regulating unit 3 is divided into several smaller branches or subbranches 33. One of the branches 33 supplies a portion of the fluid flow Q1 to a pressure reducing valve 34 which is controlled by a proportional valve 35 and serves to select fluid pressure for the lockup clutch 9 of the torque converter 5. Another branch 33 of the conduit 32 supplies fluid to a servo valve 36 which functions as a pressure reducing valve and selects that fluid pressure which is required in the transmission regulating unit 3. A third branch 33 of the conduit 32 supplies fluid to a first (transmission regulating) component 37 of the unit 3. The component 37 regulates the operation of the transmission 4 and preferably constitutes a 4/2 proportional valve. The means for controlling the operation of the component (valve) 37 comprises a further proportional valve 38.

The illustrated transmission 4 is a CVT (also called variator) and includes a first adjustable pulley or sheave 40 non-rotatably carried by the input shaft 39, a second adjustable sheave or pulley 70 non-rotatably carried by the output shaft 12, and an endless flexible element (e.g., a belt or a link chain) 45 trained over the pulleys 40, 70. The pulley 40 comprises an axially fixed conical flange 43 and an axially movable conical flange 41, and the pulley 70 comprises an axially fixed conical flange 44 and an axially adjustable conical flange 42. Reference may be had, again, to the aforementioned U.S. '730 patent to Friedman et al., or to U.S. Pat. No. 5,725,447 granted Mar. 10, 1998 to Friedman et al. for "POWER TRAIN WITH INFINETELY VARIABLE RATIO TRANSMISSION".

The pulley 40 is adjustable by a hydraulic motor 46 which causes the conical surfaces of the flanges 41, 43 to frictionally engage the adjacent end faces of the endless flexible element 45 (hereinafter called chain) with a greater or lesser force. A similar or analogous hydraulic motor 47 serves to adjust the axially movable flange 42 relative to the axially fixed flange 44 of the pulley 70. The torque sensor 8 controls the flow of hydraulic fluid to the motors 46, 47 via conduits 48, 49. Each of these motors can comprise two cylinder and piston units.

In order to select the fluid pressure which enables the first cylinder and piston units of the motors 46, 47 to urge the axially movable flanges 41, 42 against the end faces of adjacent links forming part of the chain 45, the torque sensor 8 selects the fluid pressure in conduits 48, 49 as a function of the magnitude of the torque being transmitted (by the internal combustion engine, not shown) to the input shaft 39 of the transmission 4. In other words, the extent of frictional engagement between the flanges of the pulleys 40, 70 on the one hand, and the chain 45 on the other hand, depends upon the magnitude of the torque being transmitted to the input shaft 39 of the transmission 4. The extent of the aforesaid frictional engagement is such that the pulleys 40, 70 do not slip relative to the chain 45 and/or vice versa; the slip could entail extensive wear upon and/or other damage to the transmission 4.

The second cylinder and piston units of the hydraulic motors 46, 47 serve to vary the ratio of the transmission 4. These second cylinder and piston units respectively receive hydraulic fluid via conduits 50, 51 wherein the fluid flow is regulated by the first component 37 of the transmission regulating unit 3.

The construction of the torque sensor 8, of the pairs of cylinder and piston units forming part of the hydraulic motors 46, 47, and of the first component 37 are known; reference may be had again to German patent No. 195 46 293 A1. The same holds true for the manner in which the just mentioned constituents of the automatic transmission system 1 cooperate with each other.

The conduit 15 supplies hydraulic fluid (Q3) to a pressure raising valve 52 which controls the fluid flow into the conduits 48, 49, i.e., to the torque sensor 8. A conduit 53 connects the outlet of the torque sensor 8 with the torque converter 5 so that the latter can be filled with hydraulic fluid. The torque converter 5 is installed upstream of the cooling unit (or units) 6 which, in turn, supplies (or supply) cooled fluid into the tank 30, i.e., to the injector 14 of the fluid conveying unit 2.

The conduit 53a supplies fluid to the lubricating system of the automatic transmission assembly 1. An additional conduit 53b can serve to supply hot fluid to one or more further cooling units and/or one or more additional static fluid consumers, not shown.

The pressure raising valve 52 comprises an OR-gate 54 which constitutes a second component of the transmission regulating unit 3. The gate 54 is communicatively connected (at 50a, 51a) with the conduits 50 and 51. The purpose of the valve 52 is to raise the pressure of fluid at the regulating component 37, i.e., in the conduit 32; this ensures that the fluid pressure which is available for a rapid change of the ratio of the transmission 4 (even under certain exceptional circumstances) is always sufficiently high. For example, the exceptional circumstances can be attributable to or can be caused by the motor vehicle having a power train which embodies the automatic transmission assembly 1 of FIG. 1. Exceptional (such as critical) circumstances which necessitate abrupt changes of the transmission ratio can arise when the motor vehicle is braked at a low engine torque, i.e., with rapid deceleration and, consequently, with the necessary very rapid or abrupt change of the transmission ratio. The purpose and the mode of operation of the valve 52 are fully described in the aforementioned German patent No. 195 46 293 A1.

An important advantage of the feature that the transmission assembly 1 comprises two discrete fluid supplying conduits 15 and 32 is that the conduit 32 can supply requisite quantities of hydraulic fluid (Q1) to the dynamic consumers of the transmission assembly, namely to those cylinder and piston units of the hydraulic motors 46 and 47 which effect axial adjustments of the flanges 41 and 42, to the lockup clutch 9 of the torque converter 5, and to the torque sensor 8. Leakages which develop at various corresponding valves and adjusting or regulating parts of the transmission regulating unit 3 are also covered by the fluid forming the flow Q1. The remainder (Q2) of the combined volumetric flow QG flows in the conduit 15 into the volumetric flow regulator 7, and the flow Q3 passes through the second regulating component 52 of the unit 3. The flow Q3 thereupon enters the conduits 48, 49 leading to the torque sensor 8, and through the latter into the low-pressure zone, i.e., into the torque converter 5, the cooling unit 6, one or more additional cooling units (if necessary) and the aforementioned lubricating system, namely the static fluid consumers of the transmission assembly 1.

The maximum quantity of hydraulic fluid in the conduit 53 (receiving fluid from the torque sensor 8) is influenced by the volumetric flow regulator 7 which can select such quantity to remain at a preselected value or within a predetermined acceptable range. Such selected quatity will vary to a certain relatively small extent as a result of potential leaks at the pressure raising valve 52 and/or of leakages at the outlet of the unit 3. It has been found that such minor leakages (if any) cannot unduly influence the quantity of fluid which reaches aches the static consumers of the improved transmission assembly 1. Consequently, the cooling unit 6 (either alone or with one or more additional cooling units) can ensure adequate cooling of adequate quantities of fluid which flow back into the tank 30 and thence into the injector 14 for the pump 13. Furthermore, the regulator 7 ensures that the low-pressure zone invariably receives a requisite but not excessive quantity of fluid; excessive quantities could entail damage to the cooling unit 6 and/or to the torque converter 5.

The feature that the unit 3 receives a non-regulated flow (Q1) of hydraulic fluid via conduit 32 directly from the outlet of the pump 13 ensures that the quantity of fluid being supplied to the conduit 32 suffices also or even at a time when the ratio of the transmission 4 must be changed (at 46, 47) and/or when the lockup clutch 9 for the torque converter 5 requires a relatively large quantity of fluid. Otherwise stated, the capacity of the conduit 32 to supply fluid (Q1) for the dynamic fluid consumers is such that the fluid suffices for proper operation of the transmission 4 and of the lockup clutch 4 as well as to compensate for leakages in the unit 3, i.e., such leakages (if any) and/or eventual abrupt increases of the fluid requirements at 4 and/or 9 do not affect the adequacy of fluid in the flow Q1 being supplied plied by the conduit 32.

The dot-dash lines shown in FIG. 1 indicate that the unit 2, the regulator 7 and the valve 29 can constitute a first preassembled module, and that parts of the unit 3 can constitute a second preassembled module. For example, parts of the unit 2 can be confined in a body or housing for the pump 13 (such housing will be discussed with reference to FIGS. 6, 7, 9, 10 and 12) and the housing can be affixed to a housing or casing for the constituents of the unit 3. However, it is equally within the purview of the present invention to employ two discrete conduits (15 and 32) having end portions separably connectable to suitable nipples or the like on the housing for the unit 2 and on the housing for the unit 3.

The purpose of the hydraulic resistor (such as the resistor 20 in the transmission assembly 1 of FIG. 1) is to influence the operation of the volumetric flow regulator (7), namely to select the maximum rate of fluid flow beyond the volumetric flow regulator toward the static consumer(s), such as the consumers 5 and 6. In the transmission assembly 1 of FIG. 1, the regulator 7 is influenced by the fluid streams which flow in the return conduits 23 and 26, i.e., from the conduit 15 to the valve 16 at the upstream and downstream sides of the resistor 20. The latter does not influence the flow Q1 because the conduit 32 branches off the conduit 15 upstream of the valve 16 and resistor 20. Of course, the quantity of fluid in the flow QG must be sufficient to meet the requirements of the static consumers 5, 6 as well as the requirements of the dynamic consumers 4, 9, 46, 47 plus eventual leakages in the unit 3 and abrupt rises in the fluid demands of the consumers 4, 9, 46, 47 well above the normal demands. This renders the quantity of fluid in the flow Q3 independent of the quantity (Q1) which is diverted from the quantity QG being supplied by the output of the pump (source) 13. Such situation should prevail irrespective of eventual temperature-induced and/or other leakages of fluid in the transmission regulating unit 3. At the very least, eventual temperature-induced higher or pronounced fluid leakages in the unit 3 should exert a less pronounced adverse influence upon the quantity of fluid in the flow Q3.

The transmission assembly 1 can utilize a continuously variable transmission 4 even though the fluid requirements of the hydraulic motors 46, 47 in such transmission, plus the requirements of the associated torque sensor 8, can fluctuate within a very wide range, e.g., when the motors 46, 47 are called upon to effect a substantial change in the ratio of such transmission. It has been found that the novel hydraulically operated automatic transmission assembly 1 ensures highly satisfactory delivery of fluid to the transmission 4 as well as to the static consumers (5, 6 and, if necessary, others), i.e., to the dynamic as well as to the static consumers, even when the temperature of the fluid medium is very low. Thus, the backup pressure of fluid in the low-pressure range cannot reach a level at which such backup pressure could adversely influence the torque sensor 8 which selects the pressure of fluid that serves to operate those cylinder and piston units of the hydraulic motors 46, 47 which are used to select the extent of frictional engagement between the conical surfaces of flanges in the pulleys 40, 70 and the adjacent links of the endless chain 45. The overall efficiency of the transmission 4 is more likely to remain constant if the extent of frictional engagement between the pulleys 40, 70 and the chain 45 remains within a pre-determined range.

Figure 2:
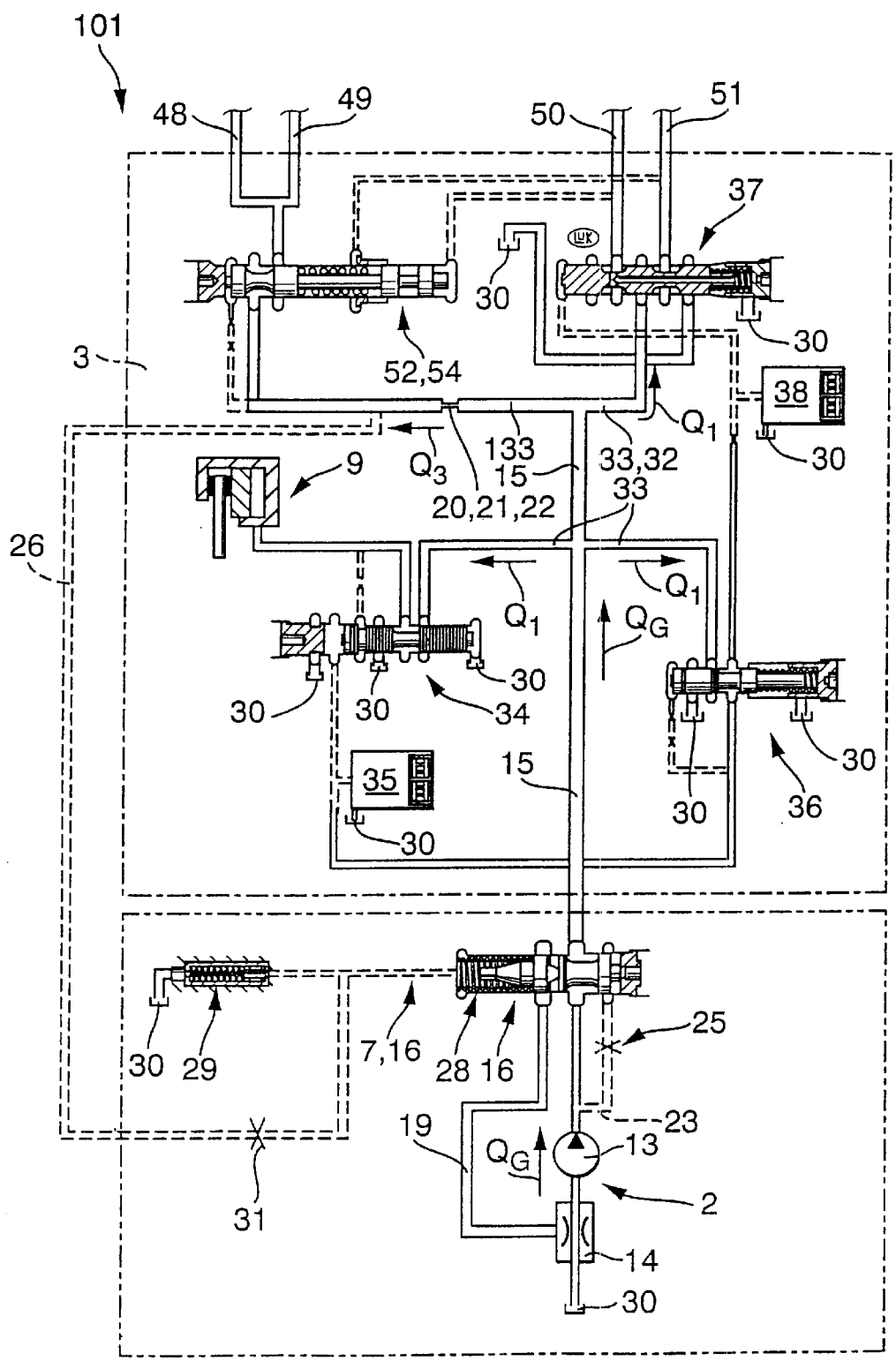
FIG. 2 is a similar view of a portion of a modified assembly.

FIG. 2 shows a portion of a modified hydraulically operated automatic transmission assembly 101. All such parts of the assembly 101 which are identical with or plainly analogous to the corresponding parts of the assembly 1 of FIG. 1 are denoted by similar reference characters and are described only to the extent which is necessary to ensure a full understanding of the construction and mode of operation of the assembly 101. The following description of the structure shown in FIG. 2 will deal primarily with those features of the assembly 101 which are different from those shown in FIG. 1, which are not present in the assembly 1 and/or which are present only in the assembly 1. The same applies for the assemblies 201, 301 and 401 certain features of which are respectively shown in FIGS. 3, 4 and 5.

The conduit 15 of the transmission assembly 101 directs the combined volumetric flow QG from the unit 7 directly into the unit 3. Thus, the conduit 32 branches off the conduit 15 downstream of the unit 7. Of course, the construction of assembly 101 can also be interpreted in such a way that the conduit 15 of FIG. 2 constitutes a third conduit which receives the flow QG from the pump 13, that the conduit 32 and its branches 33 constitute equivalents of the conduit 32 and branches 33 shown in FIG. 1, and that the conduit 133 of FIG. 2 is an equivalent of the conduit 15 in the assembly of FIG. 1.

Two branches 33 of the composite conduit 32 shown in FIG. 2 supply fluid to the servo valve 36 and to the pressure reducing valve 34 for the lockup clutch 9 forming part of the torque converter 5 (not shown in FIG. 2). A third branch 33 of the conduit 32 supplies fluid to the transmission regulating component 37. The branch 133 supplies the fluid flow Q3 from the conduit 15 (which can be said to encompass or include the conduit 32) to the pressure raising valve 52 and contains the hydraulic resistor 20.

The placing of the hydraulic resistor 20 into the conduit 133 immediately upstream of the pressure raising valve 52 does not entail a drastic departure of operation of the transmission assembly 101 from that of the assembly 1. Thus, the flow QG in the conduit 15 of FIG. 2 is divided into a multiple-armed flow Q1 and into a single flow Q3. Consequently, the flow Q1 does not share in or influence the function of the hydraulic resistor 20, i.e., it does not participate in a drop of pressure of the fluid forming the flow Q3. The combined volumetric fluid flow QG contains all the fluid which is necessary to obtain satisfactory flows Q1 and Q3 as well as to compensate for eventual leakages.

In order to ensure adequate operation of the volumetric flow regulator 7 of FIG. 2, the conduit 26 is set up to return pressurized fluid from the conduit 133 (downstream of the hydraulic resistor 20) to the module containing the volumetric flow regulator 7, and more specifically to the upstream side of the pressure limiting valve 29 in the module for the unit 2.

In contrast to the construction and mode of operation of the transmission assembly 1, the assembly 101 of FIG. 2 employs a single conduit (15) which supplies fluid from the outlet of the pump 13 to the unit 3, and a single conduit 26 (containing the damping diaphragm 31) which returns fluid from the module including the unit 3 to the module including the units 2 and 7. Only one of the conduits 15 and 26 shown in FIG. 2 must have a relatively large diameter (the assembly 1 employs two such conduits).

Those conduits which are shown in FIGS. 1 and 2 by broken lines constitute control conduits having diameters smaller or much smaller than the conduits which are shown by solid lines.

Figure 3:
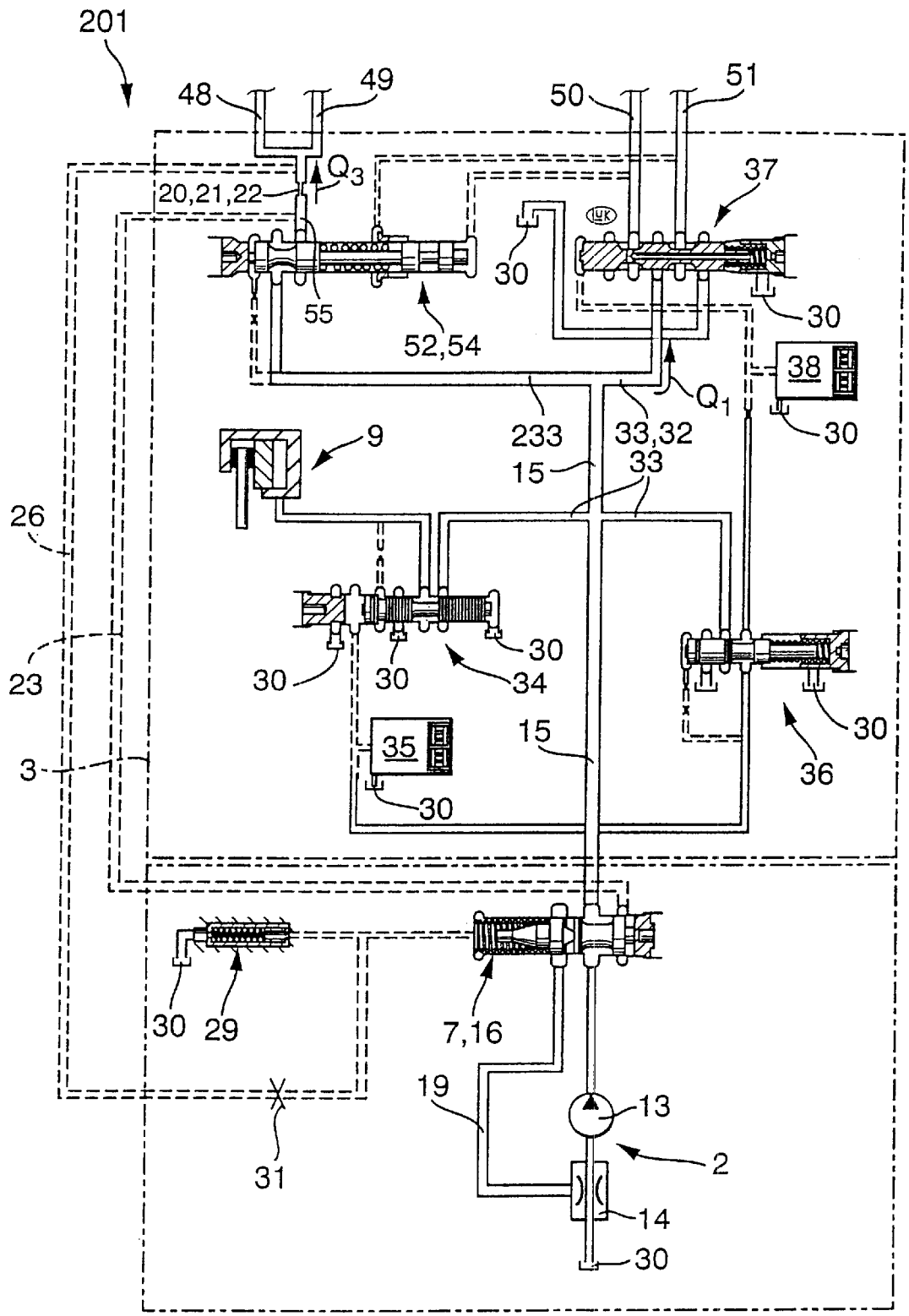
FIG. 3 is a similar view of a portion of a third assembly.

The transmission assembly 201 including the structure shown in FIG. 3 employs a hydraulic resistor 20 which is installed in a conduit 55 receiving fluid from the conduit 233 (analogous to the conduit 133 in the transmission assembly 101 of FIG. 2). The conduit 55 is located downstream of the second transmission regulating component (pressure reducing valve) 52 of the regulating unit 3 for the torque sensor 8 (not shown in FIG. 3), namely in that part of the conduit 233 which branches into conduits 48 and 49. The return conduit 23 communicates with the conduit 233 upstream of the hydraulic resistor 20, and the return conduit 26 communicates with the conduit 233 downstream of the resistor 20.

An advantage of the transmission assembly 201 is that eventual leakage of fluid at the component (valve) 52 cannot influence the parameters of the fluid flow Q3. This is achieved by the provision of, and the aforementioned connections for, the return conduits 23, 26 upstream and downstream of the component 52, respectively. Furthermore, the assembly 201 features a hydraulic resistor 20 which is installed in the transmission regulating unit 3, and a volumetric flow regulator 7 which is installed outside of the unit 3. The regulator 7 is installed in that part of the conduit 15 which connects the unit 2 with the unit 3. However, it is also possible to modify the assembly 201 in such a way that the hydraulic resistor 20 is installed outside of but the regulator 7 is installed in the unit 3.

In the transmission assembly 201 of FIG. 3, the resistor 20 is located downstream of the second transmission regulating component 52 and the static consumers (not shown in FIG. 3). Therefore, the assembly 201 must employ two return conduits 23, 26 and these conduits supply fluid streams which respectively act upon the end faces 24, 27 of the piston 18 in the valve 16 forming part of or constituting the volumetric flow regulator 7.

If the resistor 20 includes or constitutes a measuring diaphragm (22), the length of that portion which exhibits a decreasing cross-sectional area is much less than the diameter. This results in the provision of a hydraulic resistor which is practically immune to temperature changes. Such independence from changes of temperature is also attributable to the fact that the flow of fluid through a measuring diaphragm (21) is preferably a turbulent flow, and the extent of turbulence depends upon the viscosity and hence also upon the temperature of the fluid.

If the hydraulic resistor 20 constitutes or includes measuring throttle, at least a portion of the fluid flow therethrough constitutes a laminar flow. Consequently, the hydraulic resistance of the fluid flowing through a measuring throttle is a function of viscosity and hence a function of temperature. The laminar portions of the fluid flowing through the measuring throttle develop as a result of increased friction with the walls of the throttle. As is known, the area of walls in a measuring throttle is greater than that of the walls in a measuring diaphragm. Thus, if the hydraulic resistor 20 employs a throttle, the drop of pressure at elevated temperatures of the fluid is less pronounced than at lower temperatures. Consequently, the rate of fluid flow through the measuring throttle at elevated temperatures must be higher in order to ensure that the drop of pressure will be the same as if the hydraulic resistor is or includes a diaphragm. Thus, the lower limit of regulation by the regulator 7 is shifted toward a higher volumetric flow when the temperature of the fluid rises, and this exerts a stabilizing influence upon the thermal and working fluid balance of the transmission assembly.

When the temperature of the fluid is low, the lower limit of regulation is reached earlier and, therefore, the volumetric flow can be limited by the measuring throttle to thus prevent the development of excessive non-volumetric flows. This is desirable because, when the temperature is low, the non-regulated volumetric flows would generate excessive friction in the piping and excessive backup pressures, especially in the low-pressure range, i.e., at the static consumer(s). This would necessitate the provision of a pressure limiting valve. However, and since the lower limit of regulation at lower fluid pressures decreases if the hydraulic resistor is or includes a measuring throttle, the utilization of such throttle can render it possible to operate without a pressure limiting valve in the low-pressure range without risking damage to the transmission assembly as a result of the development of excessive pressures.

Figure 4:
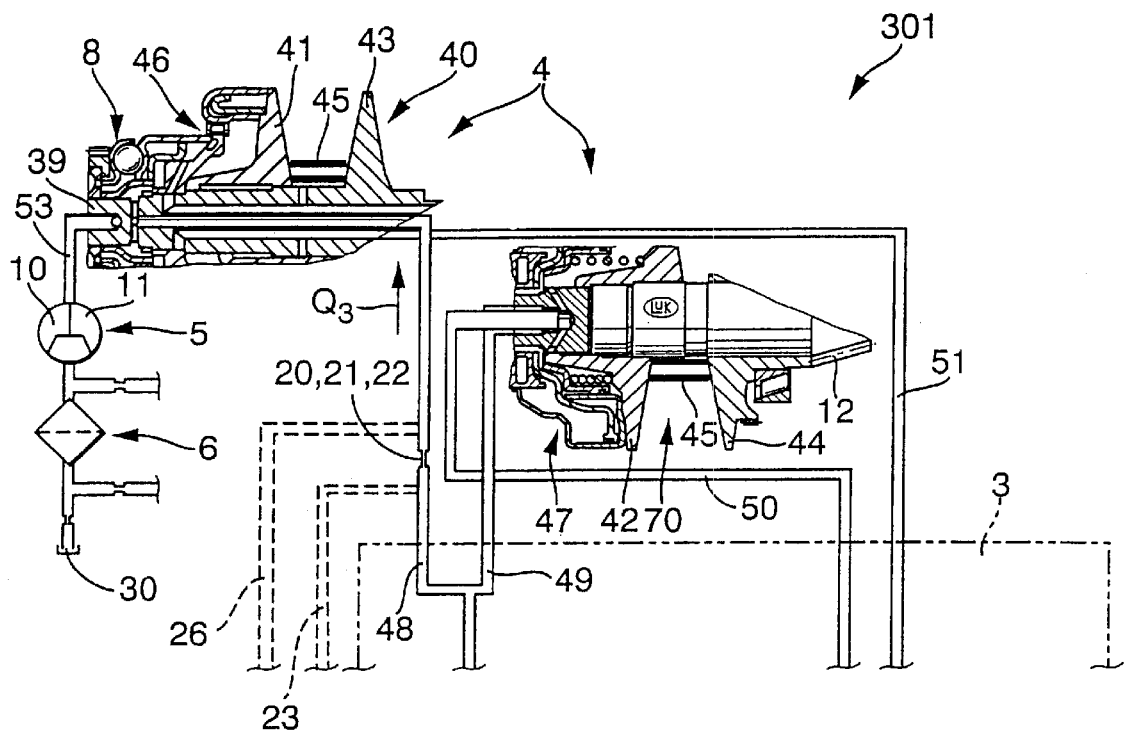
FIG. 4 is a similar view of a portion of a fourth assembly.

FIG. 4 shows a portion of a hydraulically operated automatic transmission assembly 301 wherein the hydraulic resistor 20 is installed between a pressure raising valve (corresponding to the valve 52 shown in FIGS. 1 to 3) and the hydraulic motor 46 for the mobile conical flange 41 of the pulley 40 forming part of the continuously variable transmission 4. The return conduit 23 receives fluid from the conduit 48 upstream of the hydraulic resistor 20, and the return conduit 26 receives fluid from the conduit 48 downstream of the resistor 20. The conduits 23 and 26 return fluid to the regulator 7 (not shown in FIG. 4). An advantage of the feature that the hydraulic resistor 20 is installed in the conduit 48 is that eventual leakage of fluid at the motor 47, too, fails to affect the fluid flow Q3 to the static consumers including the torque converter 5 and the cooling unit 6.

Figure 5:
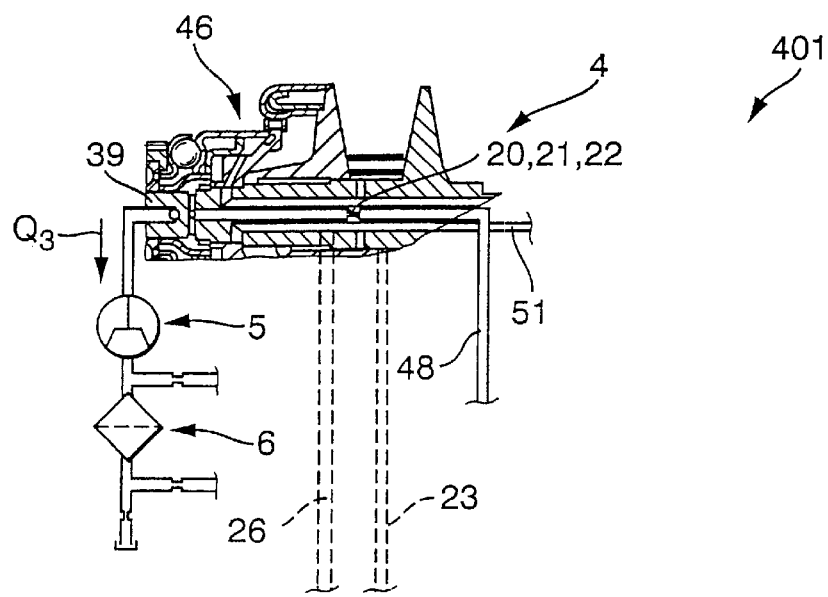
FIG. 5 is a similar view of a portion of a fifth assembly.

Referring to FIG. 5, the illustrated portion of the automatic transmission assembly 401 comprises a hydraulic resistor 20 which is installed in the conduit 48 (as in the assembly 301 of FIG. 4), and more specifically in that section of the conduit 48 which is defined by a bore or channel in the input shaft 39 of the transmission (CVT) 4. It is possible to employ a hollow tubular shaft 39 and to cause that portion of the conduit 48 which contains the hydraulic resistor 20 to extend through such hollow shaft. The return conduits 23 and 26 respectively receive hydraulic fluid from the conduit 48 upstream and downstream of the hydraulic resistor 20.

An advantage of the transmission assembly 401 of FIG. 5 is that even the leakage of hydraulic fluid at the motor 46 fails to affect the fluid flow Q3.

In accordance with a further modification which is not shown in the drawings, a hydraulic resistor corresponding to the resistor 20 shown in FIGS. 1 to 5 can be installed in the same way as in conventional automatically operated automatic transmission assemblies, i.e., so that the transmission regulating unit (corresponding to the unit 3 of FIG. 1) receives a single regulated fluid flow. Thus, the first transmission regulating component 37 also receives a regulated fluid flow. However, such transmission assembly employs a temperature-dependent hydraulic resistor as a substitute for the aforedescribed resistor 20. The temperature-dependent resistor can constitute a measuring throttle (corresponding to the throttle denoted in FIG. 1 by the reference character 21).

As already mentioned above, the hydraulic resistor 20 of FIG. 1 can include or constitute a measuring throttle 21. The same holds true for the hydraulic resistors 20 shown in FIGS. 2 to 5. It is also possible to replace the resistor 20 of each of the transmission assemblies 1, 101, 201, 301 and 401 with a temperature-responsive resistor; this further enhances the operation of the improved automatic transmission assembly of the type shown in FIG. 1, 2, 3, 4 or 5 and of its hydraulic resistor.

The reason for preferred use of a temperature-dependent resistor which constitutes or includes a throttle is that, when the fluid temperature is high, the pressure drop is less pronounced than at lower temperatures. Thus, the quantity of fluid flowing through the throttle must be increased when the fluid temperature is high because this ensures that the drop of fluid pressure is the same as or close to that which takes place when the temperature of the fluid is low. Consequently, the regulation limit at elevated temperatures is shifted in a direction toward an increased volumetric fluid flow, and this results in a stabilization of thermal and volumetric balance of fluid in the transmission 4.

If the temperature of the fluid drops, the volumetric flow can be limited by the earlier deregulation point of the measuring throttle to thus prevent the development of substantial non-regulated fluid flows. As already mentioned hereinbefore, such non-regulated fluid flows cause the development of pronounced friction between the flowing fluid and the surrounding piping. In the low-pressure region (this region embraces the static consumers), the increased friction is likely to cause the development of a pronounced backup pressure which renders it necessary to provide a pressure limiting valve. Such valve is utilized in conventional fluid-operated automatic transmission assemblies. A hydraulic resistor which includes or constitutes a throttle renders it possible to dispense with the pressure limiting valve without risking damage to parts (such as static fluid consumers) in the low-pressure region.

The just discussed throttle (21) can be replaced with a hydraulic resistor wherein the path for the flow of fluid therethrough can be varied as a function of changes of fluid temperature. Such hydraulic resistor can constitute a diaphragm (22) wherein the cross-sectional area of the path for the flow of fluid there-through can be varied by a suitable actuator which is or which can be operated by resorting to a material or substance relying upon the so-called memory effect.

Figure 6:
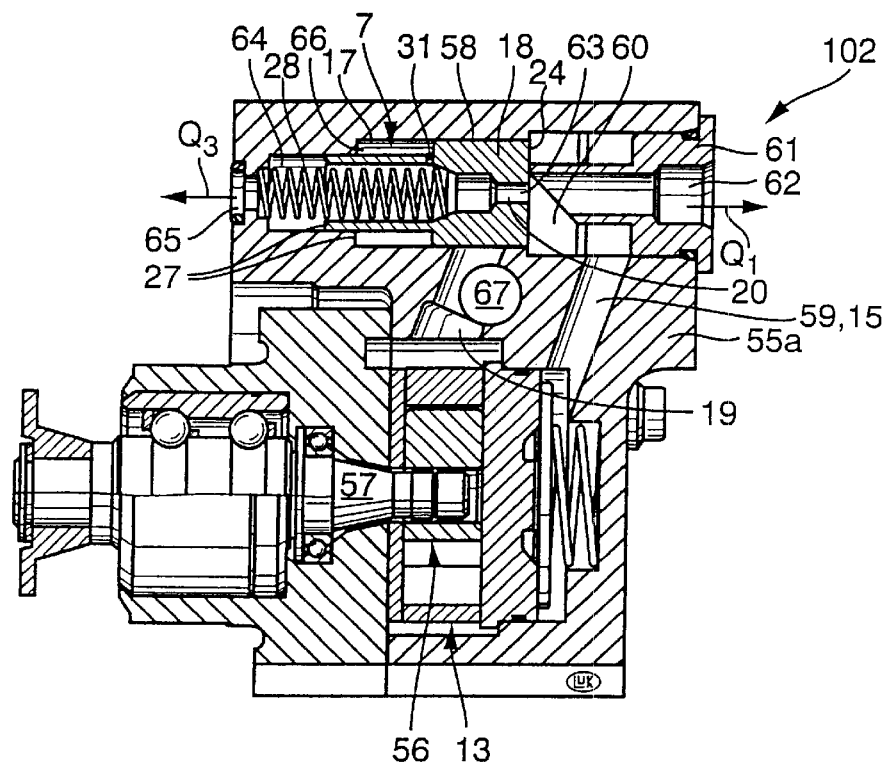
FIG. 6 is a sectional view of a fluid conveying unit which can be utilized in the improved automatic transmission assembly.
Figure 7:
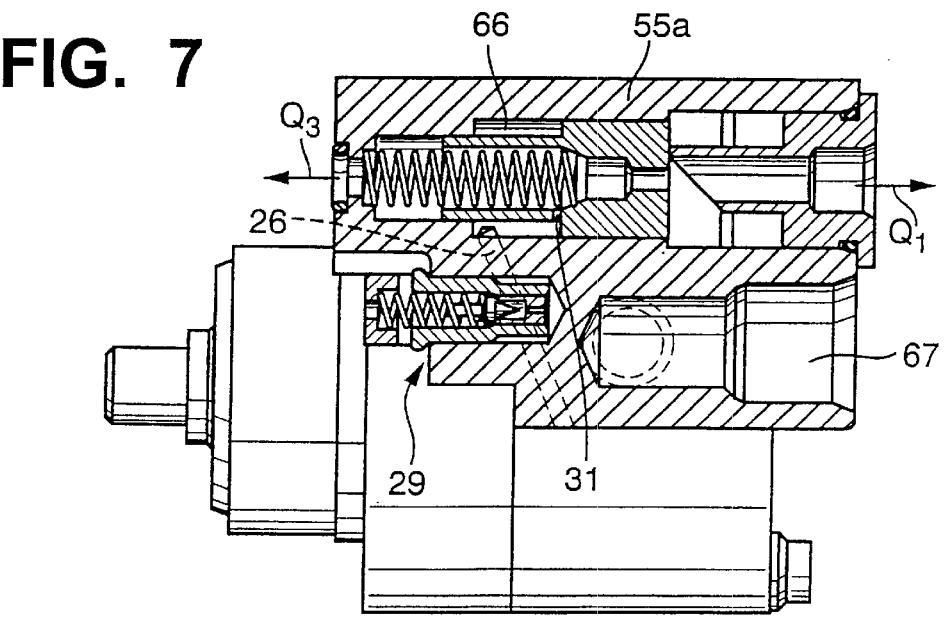
FIG. 7 is a different sectional view of the structure shown in FIG. 6.
Figure 8:
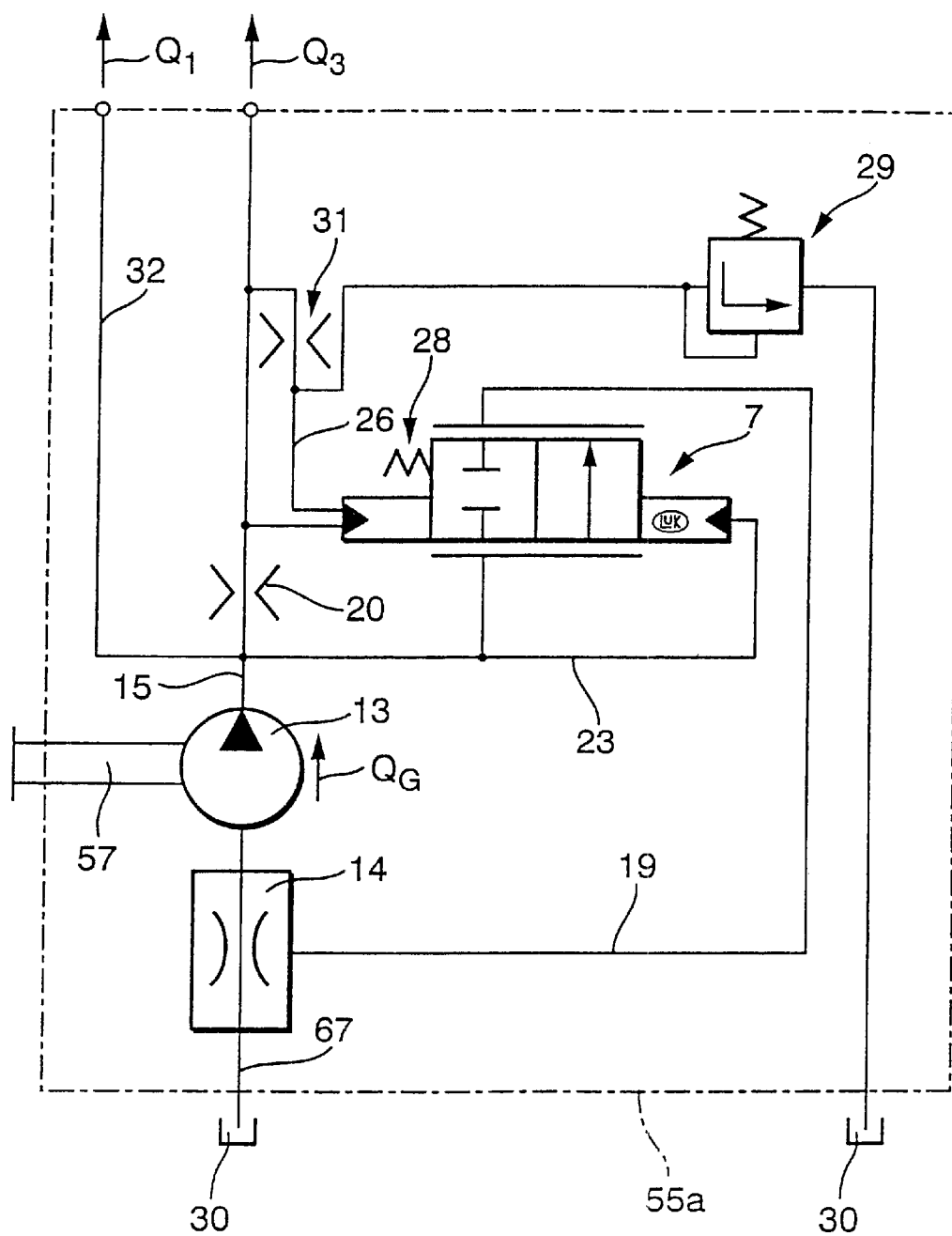
FIG. 8 is a diagrammatic view of a portion of an assembly which employs the structure of FIGS. 6 and 7.

FIGS. 6 to 8 illustrate certain details of a further automatic transmission assembly employing a modified fluid conveying unit 102. This unit comprises a housing or casing 55a which confines the pump 13; the latter can constitute a conventional vane pump having a rotor 56 receiving torque from an input shaft 57. FIG. 6 shows that the housing 55a is provided with a bore 58 having several sections with different diameters. An intermediate section 17 of the bore 58 constitutes a cylinder chamber for the piston 18 of the volumetric flow regulating valve corresponding to the valve 16 in the regulator 7 of FIG. 1. The coil spring 28 serves as a means for continuously biasing the piston 18 in a direction to the right, as viewed in FIG. 6, when the fluid pressure against the right-hand end face 24 of the piston does not suffice to overcome the bias of the spring 28 plus the fluid pressure against the composite left-hand end face 27 of the piston.

The outlet of the pump 13 is connected with a conduit 59 which is a bore provided in the housing 55a and serving to supply pressurized fluid into a plenum chamber 60. The bore 58 forms part of the conduit 15 (see FIG. 8) which supplies pressurized hydraulic fluid from the outlet of the pump 13 to the hydraulic resistor 20. The conduit 32 branches off the conduit 15 upstream of the resistor 20, i.e., in the same way as shown in FIG. 1. The plenum chamber 60 is bounded by a portion of the surface surrounding the bore 58, by the end face 24 of the piston 18 and by a stopper or plug 61 in the right-hand end portion of the bore 58 (as viewed in FIGS. 6 and 7). The plug 61 has an axial passage 62 which communicates with the plenum chamber 60. One end of the conduit 23 (see FIG. 8) is affixed to the plug 61 and can supply fluid to the chamber 60 from the conduit 15 upstream of the hydraulic resistor 20; such fluid enters the chamber 60 by way of the passage 62 in the plug 61.

The piston 18 in the section 17 of the bore 58 is provided with a stepped axial passage or channel 63. That section or end portion of the channel 63 which communicates with the plenum chamber 60 constitutes the hydraulic resistor (flow restrictor) 20. The other end portion of the channel 63 communicates with a second plenum chamber 64 which receives a portion of the coil spring 28. Thus, pressurized fluid which is supplied by the outlet of the pump 13 can flow into the plenum chamber 60 via conduit 59, and from the chamber 60 into the second plenum chamber 64 by way of the axial channel 63 in the piston 18. The chamber 64 communicates with a port 65 provided in the housing 55a and supplies fluid (flow Q3) to the OR-gate 54, i.e., to the pressure raising valve 52 (not shown in FIGS. 6 to 8).

The piston 18 of FIGS. 6 and 7 includes a portion having an outer diameter less than that of the respective section of the cylinder chamber 17. This results in the establishment of an annular third plenum chamber 66 which communicates with the second plenum chamber 64 by way of the flow damping diaphragm 31. Hydraulic fluid which fills the third plenum chamber 66 exerts pressure upon the composite end face 27 of the piston 18. The just described fluid flow regulating arrangement is similar to that described in German patent No. 198 46 815 A1 to which reference should be had for additional details and regarding the mode of operation.

The housing 55a further defines at least a portion of the return conduit 19 which, as shown in FIG. 8, serves to convey surplus fluid from the plenum chamber 60 back to the injector 14 at the inlet of the pump 13 provided, of course, that the piston 18 assumes a predetermined axial position in the cylinder chamber 17. Still further, the housing 55a is provided with a suction port 67 which supplies fluid to the tank 30.

The return conduit 19 and the suction port 67 cooperate to provide the injector 14, i.e., the kinetic energy of the fluid flowing in the conduit 19 is utilized to draw fluid from the tank 30 via suction port 67 and to thus provide the inlet of the pump 13 with a stream of pressurized hydraulic fluid. It is advisable to locate the volumetric flow regulator 7 as close to the suction intake of the pump 13 as possible; this ensures that the pressure drop in the return conduit 19 is held to a minimum i.e., the amount of available kinetic energy is maintained at a maximum value.

FIG. 7 shows that the housing 55a can accommodate the pressure limiting (relief) valve 29; this valve is connected with the third plenum chamber 66 by way of the return conduit 26. In this respect, the hydraulic circuit of FIG. 8 is similar to that shown in FIG. 1.

An advantage of the fluid conveying unit 102 and of its housing 55a is that they contribute to compactness of the automatic transmission assembly in which the housing 55a is put to use. Thus, the housing 55a can be installed close to or on or even in the transmission regulating unit 3 or an equivalent unit; this renders it possible to shorten the conduits and/or to even eliminate one or more conduits and/or to replace one or more conduits with channels or bores in the housing 55a and/or in the housing or casing of the unit 3. A shortening and/or a reduction of the overall number of conduits contributes to higher efficiency of the automatic transmission assembly.

Another advantage of the fluid conveying unit 102 is that the hydraulic resistor 20 is installed in the housing 55a, the same as the pump 13 and the volumetric flow regulator 7. This renders it possible to provide the return conduits 23, 26 in the housing 55a, i.e., the surplus fluid which is segregated from the flow in the conduit 15 can be returned to the suction side of the pump 13 via conduit 19 and the injector 14. The kinetic energy of the fluid jet which is propelled into the injector 14 is converted into potential energy, i.e., the inlet or intake of the pump 13 receives a flow of pressurized fluid. This reduces the likelihood of cavitation and exerts a beneficial influence upon the pressure equalizing process during transition from the suction stage into the pressure stage within the fluid conveying unit 2. The just described mode of operation of the units 2 and 7 is especially desirable and advantageous if the tank 30 (e.g., a sump) contains a foamy mixture of oil and air.

Figure 9:
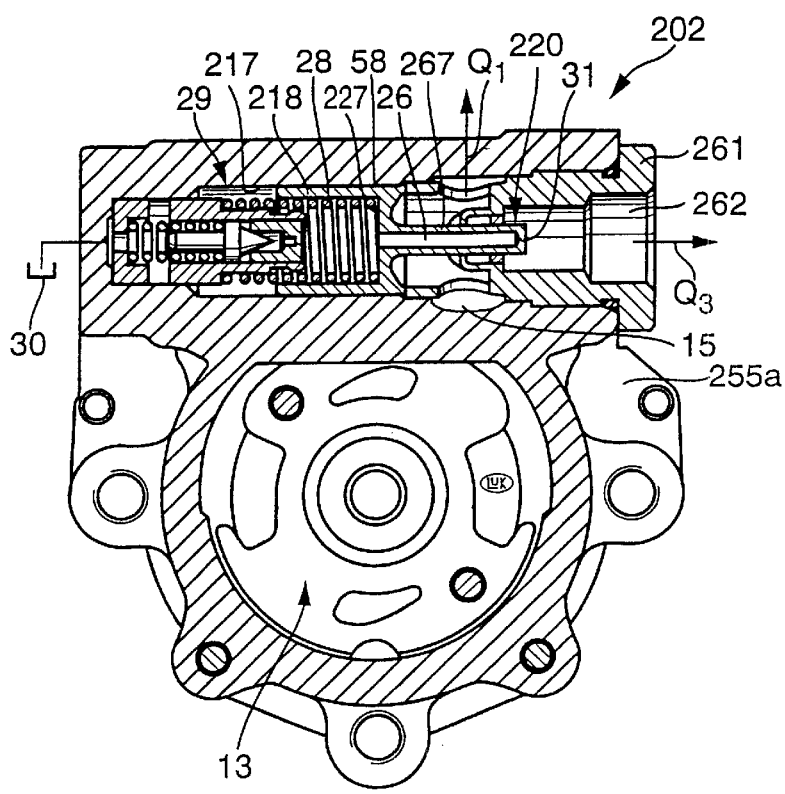
FIG. 9 is a sectional view similar to that of FIG. 6 but showing a different fluid conveying unit.
Figure 11:
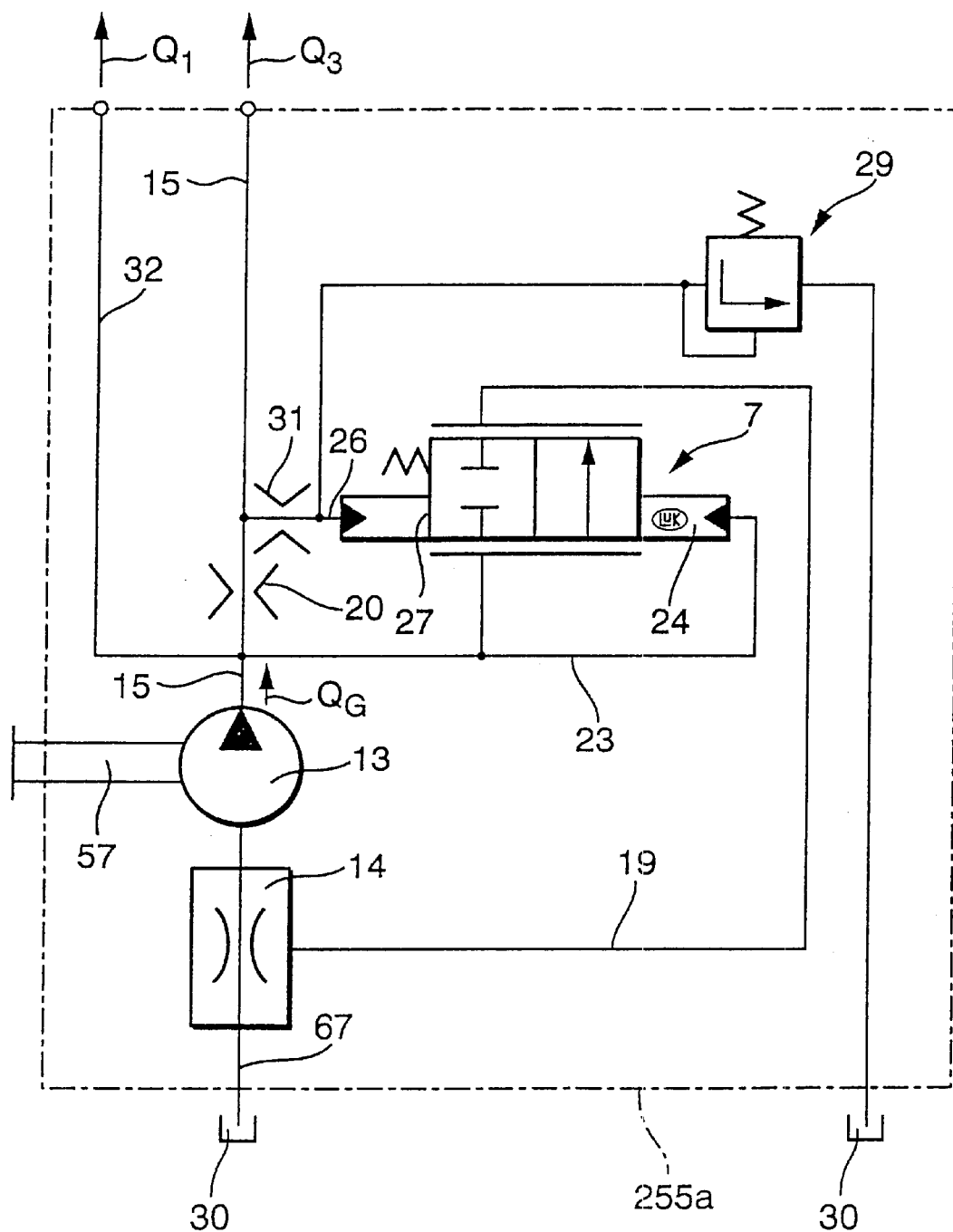
FIG. 11 is a diagrammatic view of a portion of an assembly which utilizes the structure of FIG. 9.

FIGS. 9 and 11 illustrate the details of a fluid conveying unit 202 which constitutes a modification of the unit 102 shown in FIGS. 6 to 8. The unit 202 comprises a pump 13 which is installed in a modified housing 255a. The latter further defines a cylinder chamber 217 which, in contrast to the cylinder chamber 17 shown in FIGS. 6 and 7, is a blind bore having a single open end receiving a modified (stepped) plug 261. The plug 261 has a stepped bore 262 one end portion of which receives an axial extension 267 of the piston 218. The piston 218 and the plug 261 define a hydraulic resistor 220 which is adjustable due to axial movability of the piston in its chamber 217, i.e., due to the feature that the cross-sectional area of the path for the flow of fluid around the extension 267 varies in response to axial displacement of the piston 218 in the cylinder chamber 217.

The bore 58 of the housing 255a accommodates the pressure limiting (relief) valve 29. The outer diameter of the body of the valve 29 is selected in such a way that the (tubular) piston 218 can be slipped onto this body. Furthermore, the extension 267 is provided with a bore which renders it possible to convey fluid from the downstream side of the adjustable hydraulic resistor 220 against the composite surface or end face 227 of the piston 218.

FIGS. 9 and 11 show that conventional fluid conveying units can be modified to arrive at the novel unit 202. The same holds true for the fluid conveying unit 302 of FIG. 12. In each instance, the fluid conveying unit (202 or 302) must be combined with a volumetric flow regulator 7 or an analogous flow regulator. This applies even though the hydraulic resistor (220 or 320) is installed in the transmission regulating unit (corresponding to the unit 3 in the transmission assembly 1 of FIG. 1). The return conduits 23 and 26, too, can be provided in the transmission regulating unit 3 or in an equivalent unit.

Figure 12:
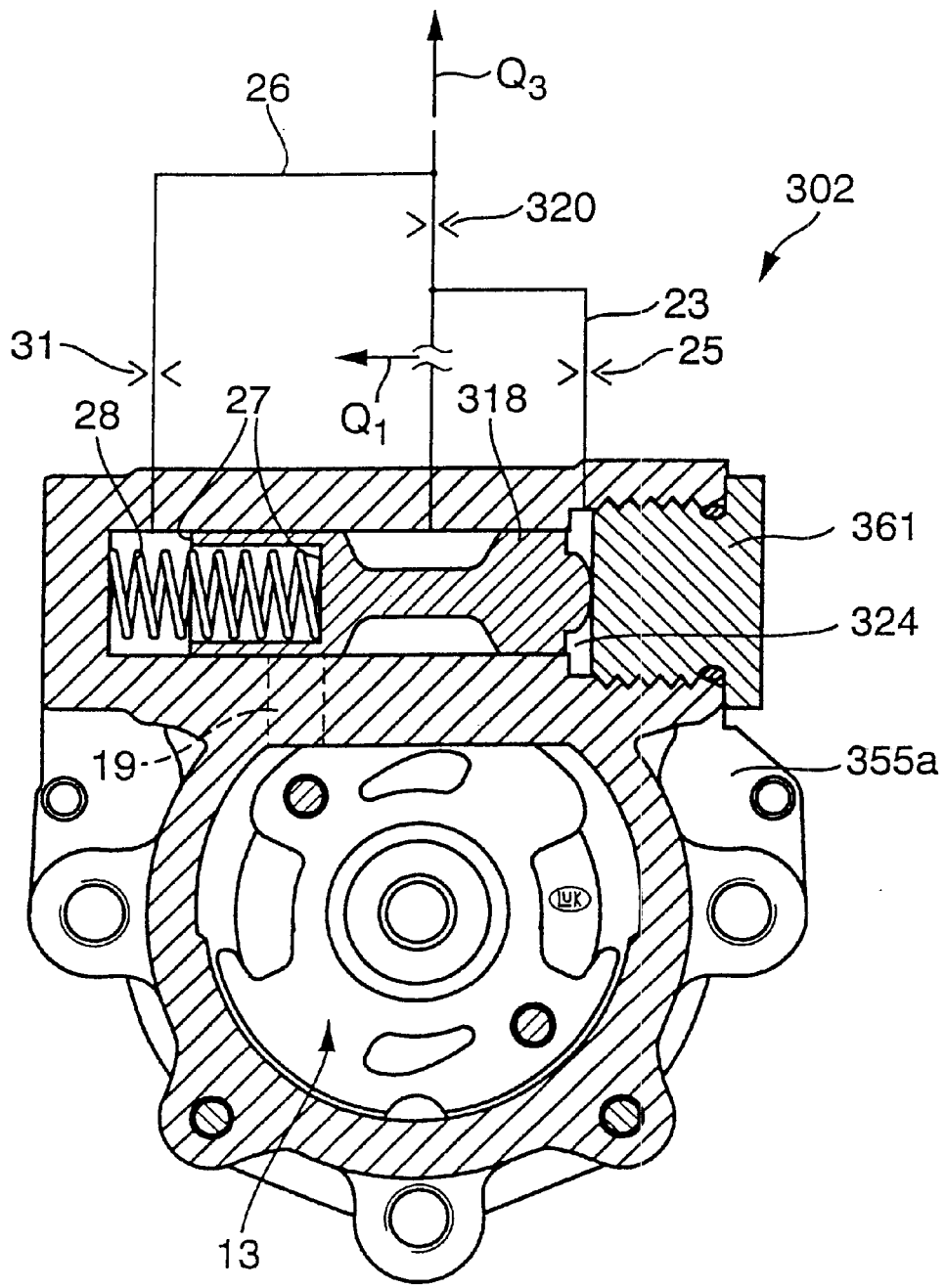
FIG. 12 is a sectional view of a fluid conveying unit which constitutes a further modification of the unit shown in FIG. 9.

The parts of the fluid conveying units 202 and 202A (FIGS. 9 and 11 and FIG. 10) and 302 (FIG. 12) which are identical with or clearly analogous to each other are denoted by identical reference characters and will not be discussed again. On the other hand, those parts of the unit 202A and unit 302 which are different from the corresponding parts of the unit 202 are denoted by similar reference characters plus the letter A (FIG. 10) or plus 100 (FIG. 12). The unit 302 of FIG. 12 is particularly suitable for use in automatic transmission assemblies which do not employ a pressure limiting valve. However, if the unit 302 of FIG. 12 does employ a pressure limiting valve 29 (or an equivalent thereof), such valve is installed between the damper diaphragm 31 and the respective plenum chamber. In such embodiments, the pressure limiting valve (29) can be installed in the housing 355a or in a conduit which connects to the transmission regulating unit (3).

The volumetric flow regulator 7 is or can be installed in the housing 255a or 355a of the fluid conveying unit 202 or 302; alternatively, the regulator 7 is preferably installed close to the fluid conveying unit 202 or 302. As already explained hereinbefore, this simplifies and facilitates or enhances charging of the pump 13. The hydraulic resistor (20, 220 or 320) which determines the characteristics of the fluid flow Q3 (preferably) is or can be installed in the housing of the fluid conveying unit. It is often preferred to integrate the hydraulic resistor into the volumetric flow regulator 7 (refer again to FIGS. 6, 7 and 9). In such assemblies, the outlets for the fluid flows Q1 and Q3 are preferably provided in the housing (such as 55a or 255a) of the fluid conveying unit. This, too, is shown in FIGS. 6–7 and 9.

Figure 10:
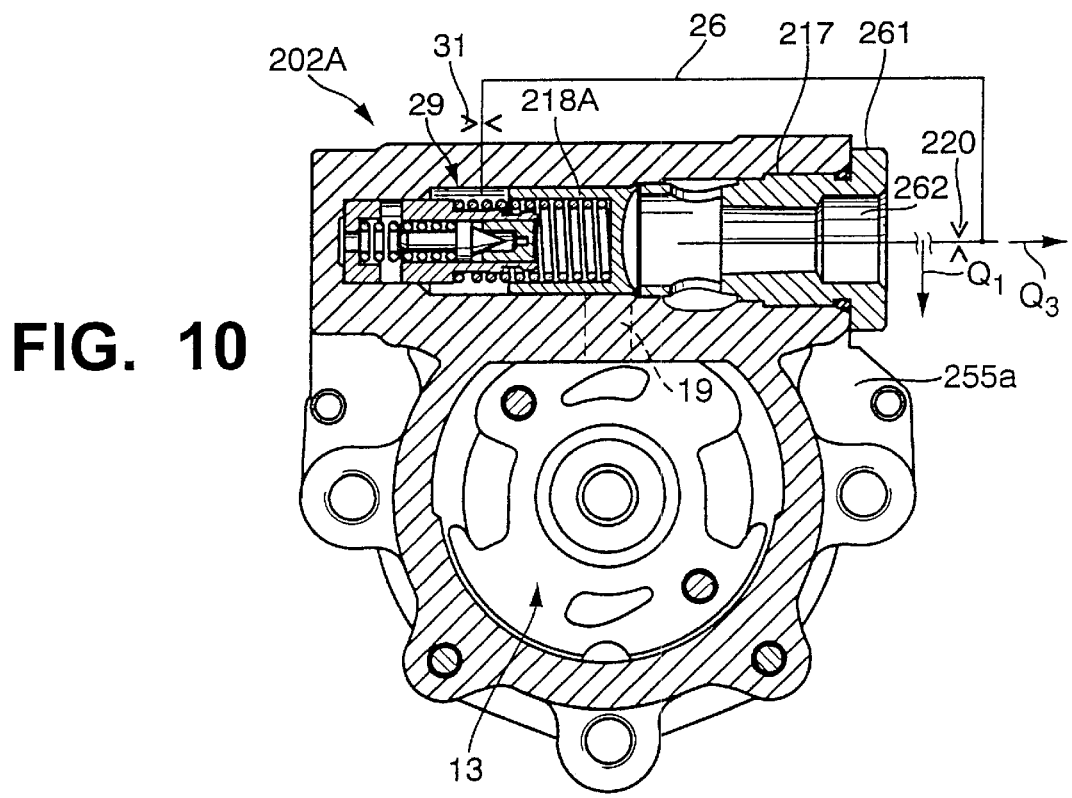
FIG. 10 is a sectional view of a structure constituting a modification of the structure shown in FIG. 9.

As shown in FIGS. 10 and 12, it is possible to install the hydraulic resistor (such as 220 or 320) externally of the fluid conveying unit (such as 202A and 302). Furthermore, the combined flow QG can be divided into the flows Q1 and Q3 externally of the housing for the fluid conveying unit; however, and contrary to the arrangements which are shown in FIGS. 10 and 12, such division or splitting of the flow QG into the flows Q1 and Q3 can also take place outside of the housing 255a or 355a. All that counts is to ensure that the flow QG which is supplied by the unit 2, 202 or 302 be divided into the flows Q1 and Q3 in such a way that the flow Q3 is not influenced by the dynamic consumer(s). This can be achieved, regardless of the selected locus for the hydraulic resistor, by causing the flow Q1 to be branched off the combined flow QG upstream of the hydraulic resistor.

The fluid conveying unit 102 of FIGS. 6 to 8 can be utilized with advantage in the automatic transmission assembly 1 of FIG. 1; the unit 202 of FIGS. 9 and 11 can be utilized with advantage in the assembly 101 of FIG. 2; and the unit 302 of FIG. 12 is particularly suited for use in the assembly 201, 301 or 401 of FIG. 3, 4 or 5.

FIG. 10 illustrates a modification (202A) of the fluid conveying unit 202 shown in FIGS. 9 and 11. The return conduit 19 is provided in the housing 255a and the splitting of the combined flow into the flows Q1 and Q3 takes place outside of such housing. However, in each of these embodiments, the flow Q1 is caused to branch off the combined flow QG (see FIG. 11) upstream of the hydraulic resistor 220.

The piston 218A of FIG. 10 does not include a portion corresponding to the extension 267 of the piston 218 shown in FIG. 9.

In FIG. 12, the piston 318 does not have an axial bore, and its end face 324 can come into abutment with a solid stopper or plug 361.

To summarize the steps of the improved method: such method comprises the steps of establishing a source (such as 13) of hydraulic fluid, supplying a first fluid flow (such as Q1) to at least one dynamic consumer (such as 4 and/or 9) along at least one first path (e.g., via conduit 32), and conveying a second fluid flow (such as Q3) to the static consumer(s) (such as 5 and/or 6) along at least one second path (such as via conduits 15, 48, 53, 53a, 53b) wherein the fluid is not influenced by the dynamic consumer(s). Such method renders it possible to maintain the quantity of fluid for the static consumers within an acceptable range irrespective of eventual leakages in the transmission regulating unit (such as the unit 3) and irrespective of requirements (including pronounced fluctuations of requirements) of the dynamic consumer(s). In addition, the influence of fluctuations of fluid temperature upon the static consumer(s) is greatly reduced or eliminated. Otherwise stated, the improved method greatly enhances the likelihood that the static consumer(s) invariably receives or receive acceptable quantities of hydraulic fluid, regardless of eventual (pronounced or less pronounced) fluid requirements of the dynamic consumer(s) and/or of the transmission regulating unit.

One embodiment of the method includes regulating the volumetric flow (i.e., the rate of fluid flow) along the second path (for the static fluid consumer or consumers). This invariably guarantees that each static consumer receives a requisite quantity of hydraulic fluid. In addition, a regulation of the rate of fluid flow to the static consumer(s) prevents the delivery of excessive quantities of fluid to such consumer(s). The same result can be achieved by resorting to the step of controlling the pressure of hydraulic fluid which is to be supplied to the static consumer(s).

A presently preferred embodiment of the method further comprises the steps of conveying a third fluid flow (QG) from the source (13) along a third path (such as in the lower part of the conduit 15 as viewed in FIG. 1), diverting a first portion of third flow from the third path into the first path (such as into the conduit 32 of FIG. 1) to thus form the first flow (Q1), and diverting a second portion (Q2) of the third flow (QG) from the third path into the second path (e.g., into that portion of the conduit 15 shown in FIG. 1 which is located downstream of the hydraulic resistor 20) to thus form the second flow (Q3)).

The flow Q1 is or can be segregated from the flow Q3 before the rate of the flow Q1 (to the static consumer(s) undergoes a regulation, i.e., such regulation can take place downstream of the locus where the conduit 32 of FIG. 1 branches off the conduit 15.

It is also within the scope of the invention to resort to a method according to which the first (Q1) and second (Q3) fluid flows are propagated along the respective paths (in the conduits 32 and 15 of FIG. 1) independently of each other. Thus, it is possible to utilize discrete pumps, at least one for each of the fluid flows Q1 and Q3. The first fluid stream or flow can be conveyed from the respective source(s) directly to the dynamic consumer(s), and the second fluid flow can be conveyed from the respective source(s) directly to the static consumer(s). Such method renders it possible to employ the source or sources of the first flow as a means for conveying the first fluid flow or flows to the dynamic consumer(s) without any volumetric regulation. However, the rate of flow of fluid from the respective discrete source(s) to the static consumer(s) can be regulated to the desired or required extent. Here, again, the second fluid flow (such as the flow Q3 in FIG. 1) is not or need not be influenced by the transmission regulating unit (3) and/or by the dynamic consumer(s) such as 4 and 9.

Fluid conveying units somewhat similar to those shown in FIGS. 6 to 12 of the present application are disclosed in commonly owned copending patent application Ser. No. 09/173,218 filed Oct. 15, 1998 by Ivo Agner et al. for "VALVE ARRANGEMENT AND PUMP FOR A GEAR SYSTEM".

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydraulically operated automatic transmission assemblies and, therefore, such adaptations should and are intended to be comprehended within the meaning and range of equivalence of the appended claims.

What is claimed is:

1. A hydraulically operated automatic transmission assembly comprising:
    at least one static fluid consumer;
    at least one dynamic fluid consumer;
    a source of pressurized hydraulic fluid having an outlet;
    a fluid supplying first conduit connecting said outlet with said at least one static fluid consumer;
    a volumetric flow regulator in said first conduit;
    means for influencing said flow regulator, including a hydraulic resistor in said first conduit;
    a second conduit receiving fluid from said first conduit upstream of said hydraulic resistor and being connected to said at least one dynamic fluid consumer; and
    a transmission regulating unit including at least one component arranged to regulate the flow of fluid in said second conduit, wherein said volumetric flow regulator is installed in said transmission regulating unit.

2. The transmission of claim 1, further comprising:
    means for supplying a first flow of pressurized fluid from said source to the at least one dynamic consumer along a first path wherein the first flow is influenced by said at least one regulating component; and
    means for conveying a second flow of pressurized fluid from said source to said at least one static consumer along a second path wherein the fluid is not influenced by said at least one dynamic consumer.

3. The transmission assembly of claim 1, wherein said second conduit branches off said first conduit upstream of said volumetric flow regulator.

4. The transmission assembly of claim 1, wherein said influencing means is installed in said first conduit downstream of said volumetric flow regulator and said second conduit branches off said first conduit downstream of said volumetric flow regulator but upstream of said influencing means.

5. The transmission assembly of claim 1, further comprising a fluid conveying unit having a housing for said source, said hydraulic resistor being disposed in said housing.

6. The transmission assembly of claim 1, further comprising a fluid conveying unit having a housing for said source and for said volumetric flow regulator.

7. The transmission assembly of claim 1, wherein said hydraulic resistor is installed in said transmission regulating unit, and further comprising at least one additional conduit for returning fluid from said hydraulic to said volumetric flow regulator.

8. The transmission assembly of claim 1, wherein said source forms part of a fluid conveying unit and said hydraulic resistor is installed in said first conduit between said source and said transmission regulating unit.

9. The transmission assembly of claim 1, further comprising a fluid conveying unit including said source and being affixed to said transmission regulating unit.

10. The transmission assembly of claim 1, wherein said transmission regulating unit comprises a plurality of components arranged to regulate the flow of fluid in said second conduit, said conduit including a section connecting one of said plurality of components with said at least one static consumer and said hydraulic resistor being disposed in said section of said first conduit.

11. The transmission assembly of claim 1, wherein said volumetric flow regulator comprises a valve having a body defining a chamber and a reciprocable valving element in said chamber.

12. The transmission assembly of claim 11, wherein said valving element has first and second end faces, and further comprising a first return conduit having an intake end communicating with said first conduit upstream of said hydraulic resistor and a discharge end communicating with said chamber at said first end face of said valving element, and a second return conduit having an inlet communicating with said first conduit downstream of said hydraulic resistor and an outlet communicating with said chamber at said second end face of said valving element.

13. The transmission assembly of claim 1, wherein said hydraulic resistor comprises a measuring diaphragm.

14. The transmission assembly of claim 1, wherein said hydraulic resistor comprises a measuring throttle.

15. The transmission assembly of claim 1, further comprising a return conduit having an inlet communicating with said conduit downstream of said hydraulic resistor and an outlet discharging fluid into said flow regulator, and a damping diaphragm provided in said return conduit.

16. The transmission assembly of claim 1, further comprising a fluid conveying unit including said source, said hydraulic resistor being installed in said transmission regulating unit.

17. The transmission assembly of claim 1, further comprising a fluid conveying unit including said source, said hydraulic resistor and said flow regulator, said first conduit having a first portion disposed in said fluid conveying unit and a second portion connected with said at least one static consumer, said second conduit having a first portion disposed in said fluid conveying unit and a second portion connected with said at least one dynamic consumer.

18. The transmission assembly of claim 1, wherein said at least one dynamic fluid consumer comprises a transmission.

19. The transmission assembly of claim 1, wherein said at least one dynamic fluid consumer comprises at least one clutch.

20. The transmission assembly of claim 1, wherein said at least one dynamic fluid consumer comprises a continuously variable transmission and a clutch.

21. The transmission assembly of claim 1, wherein said at least one dynamic fluid consumer comprises a continuously variable transmission.

22. The transmission assembly of claim 1, wherein said at least one static fluid consumer comprises a fluid cooling unit.

23. The transmission assembly of claim 1, wherein said at least one static fluid consumer comprises a torque converter.

24. The transmission assembly of claim 23, further comprising an additional static fluid consumer including a fluid cooling unit.

25. The transmission assembly of claim 1, wherein said at least one dynamic fluid consumer comprises a continuously variable transmission and a torque sensor associated with said continuously variable transmission.

26. The transmission assembly of claim 1, wherein said at least one dynamic fluid consumer comprises a first adjustable pulley, a second adjustable pulley, an endless flexible element trained over said pulleys, and hydraulic fluid-operated adjusting motors for said pulleys.

27. The transmission assembly of claim 1, wherein said transmission regulating unit comprises a hydraulically adjustable continuously variable transmission and said at least one dynamic fluid consumer comprises hydraulic adjusting means for said continuously variable transmission.

28. A hydraulically operated automatic transmission assembly, comprising:
    at least one static fluid consumer;
    at least one dynamic fluid consumer;
    a fluid conveying unit including a source of pressurized hydraulic fluid, said source having an outlet;

a fluid supplying first conduit connecting said outlet with said at least one static fluid consumer;

a volumetric flow regulator in said first conduit downstream of said fluid conveying unit;

means for influencing said flow regulator including a hydraulic resistor disposed in said first conduit and arranged to influence said flow regulator, said hydraulic resistor being variable as a function of temperature changes;

a second conduit receiving fluid from said first conduit upstream of said hydraulic resistor and being connected with said at least one dynamic consumer; and a transmission regulating unit including at least one component arranged to regulate the flow of fluid in said second conduit.

29. The transmission assembly of claim 28, wherein said hydraulic resistor comprises a measuring throttle.

30. The transmission assembly of claim 28, wherein said hydraulic resistor defines a path for the flow of hydraulic fluid from the outlet of said source to said at least one static fluid consumer, said path being variable as a function of temperature changes.

* * * * *